(12) United States Patent
Gill et al.

(10) Patent No.: US 10,179,657 B1
(45) Date of Patent: *Jan. 15, 2019

(54) IDENTIFICATION AND POSITION SENSOR FOR PAYLOAD BAY

(71) Applicant: Amazon Technologies, Inc., Seattle, WA (US)

(72) Inventors: Ramsey Gill, Des Moines, WA (US); Walker Chamberlain Robb, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,533

(22) Filed: Nov. 16, 2017

Related U.S. Application Data

(63) Continuation of application No. 15/274,355, filed on Sep. 23, 2016, now Pat. No. 9,850,001.

(51) Int. Cl.
| | |
|---|---|
| *G06K 15/00* | (2006.01) |
| *B64D 47/00* | (2006.01) |
| *G06K 7/10* | (2006.01) |
| *G06K 7/14* | (2006.01) |
| *B64C 39/02* | (2006.01) |

(52) U.S. Cl.
CPC ............ *B64D 47/00* (2013.01); *B64C 39/024* (2013.01); *G06K 7/10722* (2013.01); *G06K 7/1413* (2013.01); *B64C 2201/108* (2013.01); *B64C 2201/128* (2013.01)

(58) Field of Classification Search
CPC .............. G06K 17/00; G06K 7/10693; G06K 7/10722; G06K 7/1413; G06Q 30/06; G06Q 20/20; G06Q 10/087; G06Q 10/08; G07B 15/02; G07B 15/00; B64D 47/00
USPC ............................ 235/462.13, 383, 385, 384
See application file for complete search history.

(56) References Cited

U.S. PATENT DOCUMENTS

2012/0059769 A1  3/2012  Carpenter
2016/0292403 A1  10/2016  Gong et al.

OTHER PUBLICATIONS

Office action for U.S. Appl. No. 15/274,355, dated Apr. 7, 2017, Ramsey Gill, "Identification and Position Sensor for Payload Bay", 5 pages.

*Primary Examiner* — Karl D Frech
(74) *Attorney, Agent, or Firm* — Lee & Hayes, P.C.

(57) ABSTRACT

A system including a payload bay having at least one sensor configured to determine the identity of an object being transported in the payload bay and verify that the object is properly seated within the payload bay. As an object is inserted into the payload bay of the vehicle, the sensor(s) detects a pattern located on the side of the object. As the sensor(s) detects the pattern, it transmits information that enables the system to determine both the identity of the object and position of the object within the payload bay. In this way, the sensor(s) enables the system to identify when a wrong object is loaded into the payload bay, and/or when the object is improperly seated within the payload bay.

20 Claims, 9 Drawing Sheets

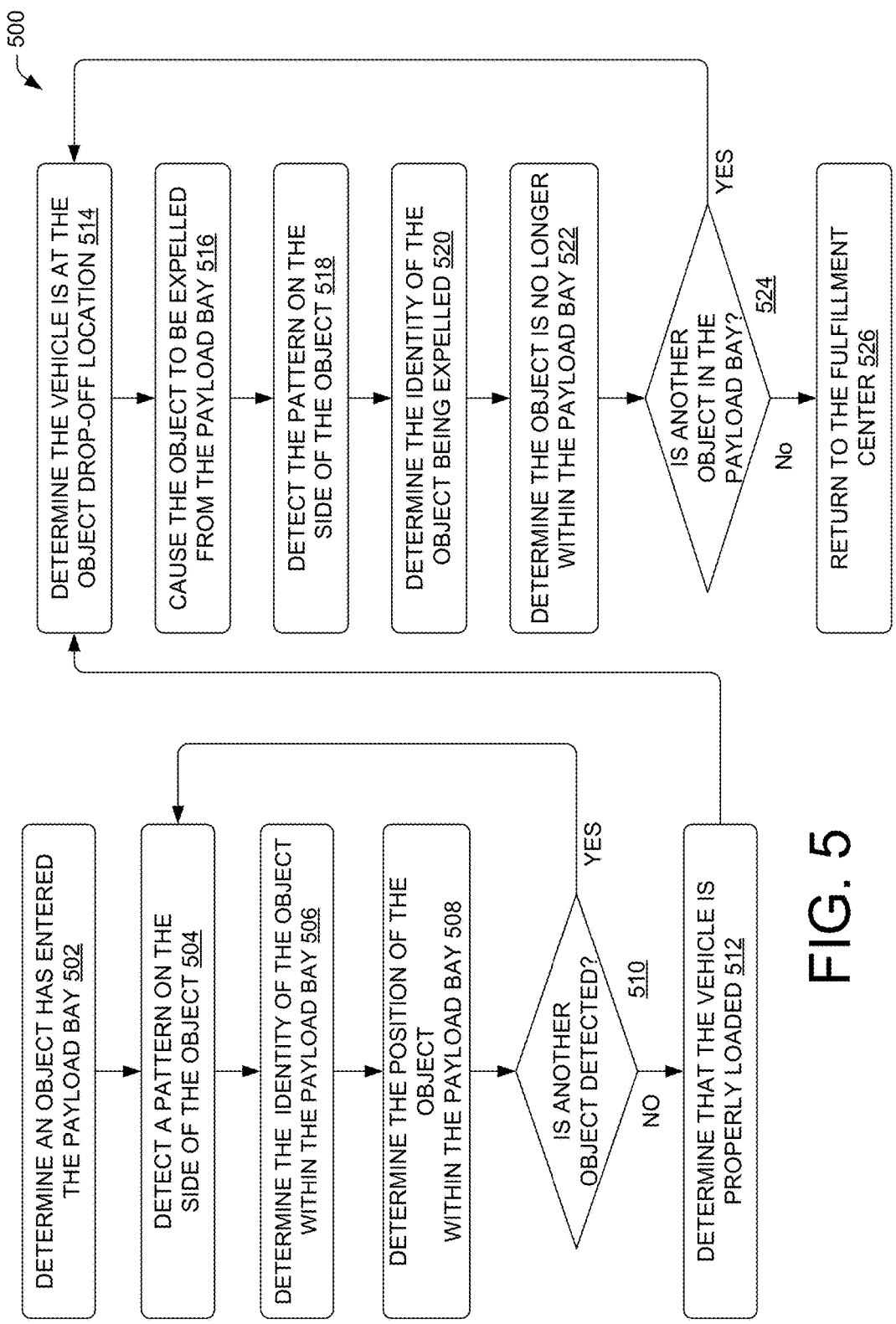

IDENTIFICATION AND POSITION SENSOR FOR PAYLOAD BAY

CROSS-REFERENCE TO RELATED APPLICATION

This application is a continuation of and claims priority to U.S. patent application Ser. No. 15/274,355, filed on Sep. 23, 2016, entitled "IDENTIFICATION AND POSITION SENSOR FOR PAYLOAD BAY", the entire contents of which are incorporated herein by reference.

BACKGROUND

Some unmanned aerial vehicles (UAVs) include payload bays that allow the UAVs to transport objects during flight. Delivery of objects via UAV is desirable, as it avoids many of the drawbacks of traditional shipping methods (i.e., postage, pick up times, street traffic, etc.). To ensure safe carriage of objects in the payload bay, the object must be properly seated in the payload bay throughout the flight. To achieve this goal, it is important to for the UAV to be designed to identify whether objects within its payload bay are properly positioned at various points during transport.

When transporting objects, it is also important for the UAV to be able to verify that an object placed within its payload bay corresponds to the object that it is intended to transport. Additionally, for efficiency and replicability, it is also desirable for the UAV to be able to perform operations with minimal operator assistance.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a flow diagram of an illustrative process for loading a vehicle and delivering one or more objects using a sensor configured to determine the identity of each object being transported in a payload bay and verify that each object is properly seated.

DETAILED DESCRIPTION

Figure 1:
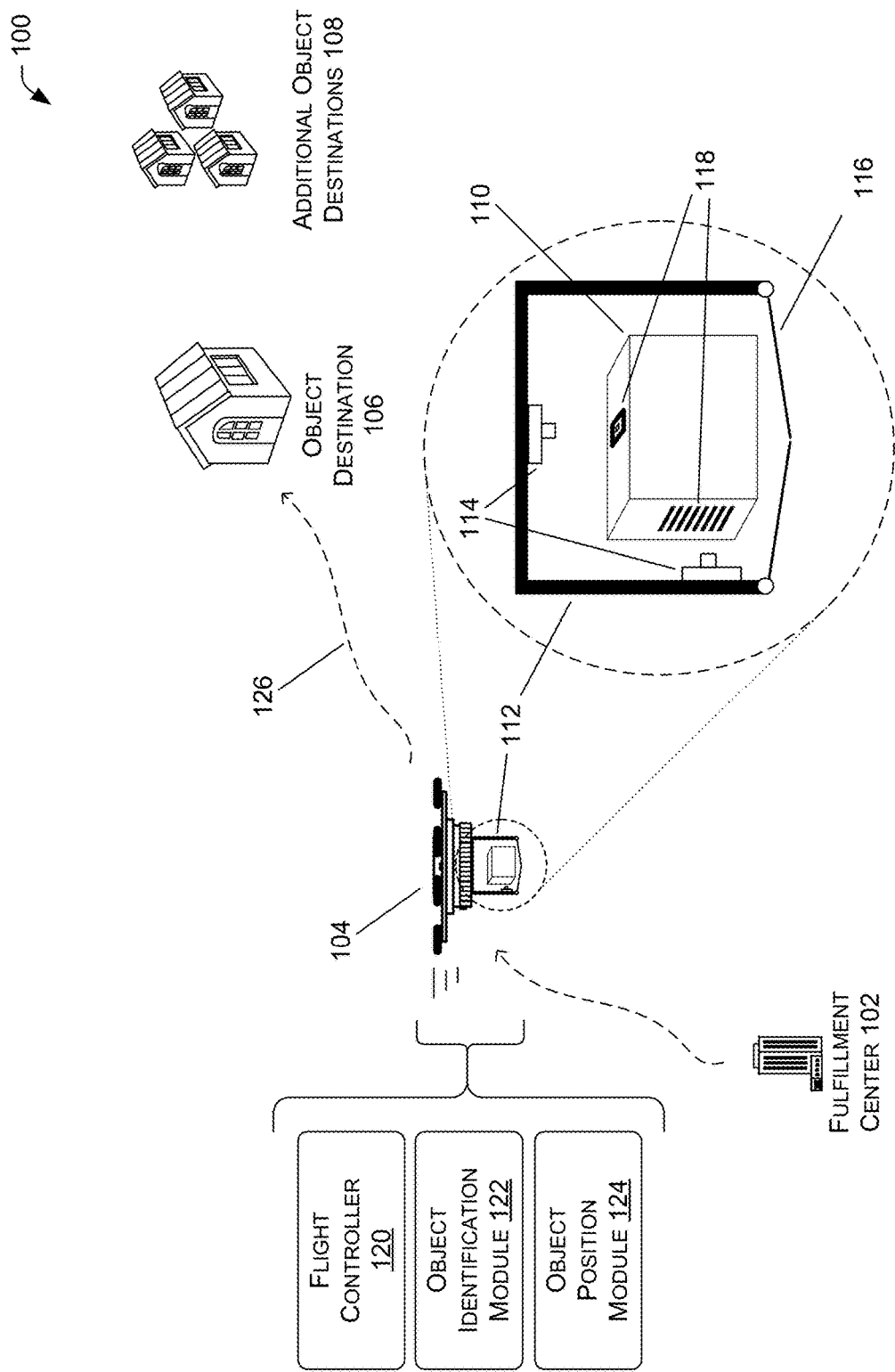
FIG. 1 is a schematic diagram of an illustrative environment that includes an unmanned aerial vehicle (UAV) with a payload bay including a sensor configured to determine an identity of an object in the payload bay and verify that the object is properly seated.

This disclosure is generally directed to the use of one or more sensors to determine the identity of an object being transported in the payload bay of a vehicle (such as an unmanned aerial vehicle (UAV)), and verify that the object is properly seated within the payload bay. In some embodiments, a single sensor may perform at least both of these functions. The sensor may be implemented as an infrared sensor (e.g., time of flight sensor, rangefinder, infrared proximity sensor, linear encoder, etc.), barcode scanner, QR scanner, vision sensor (e.g., optical sensor, camera, etc.), Hall effect sensor, string potentiometer, micro-switch, ultrasonic proximity sensor, rotary encoder, or any other sensor capable of reading a code and position information from a package. The system may be configured to utilize sensor information to determine distances, positions, and orientations of objects in view of the sensor, as well as determine the identity of the object. The sensor may be located within a payload bay of the vehicle.

As an object (e.g., a package to be delivered) is inserted into the payload bay of the vehicle, the sensor may detect the presence of the object. The sensor may further detect a pattern located on the object. The pattern may be printed on the side of the object, may be located on a label that is affixed to the side of the object, or a combination thereof. For example, in an embodiment, as the object is inserted into the payload bay, a pattern printed on the side of the box may pass in front of an infrared scanning sensor located within the payload bay. As the object passes the infrared scanning sensor, the sensor detects the pattern and transmits information to a processor to determine both the identity and position of the object. For example, if the pattern on the side of the object is a series of printed bars, the sensor may transmit pattern information including the width of the bars, width of the spaces between the bars, the number of bars etc. Based on this pattern information, the system can then determine the identity of the object that the pattern corresponds to, and/or the position of the object within the payload bay.

In some embodiments, based on the pattern information, the processor may determine or access identification information relating to the identity of the object. For example, the pattern information may correspond to a barcode or 2D barcode (e.g., data matrix, QR code, PDF417, Aztec, etc.) included within the patter, and the system can then determine or access identity information associated with the barcode or 2D barcode. In some embodiments, the position of the object may be determined based on a number of bars within the pattern that have been detected by the sensor, the width of the bars, information conveyed by the bars (e.g., one or more of the bars may correspond to barcodes that conveys positional information), etc. Alternatively or in addition, the system may access information corresponding to the dimensions of the object that the pattern corresponds to. The system may then determine, based on the amount of the pattern that the sensor has detected and/or sensor readings of one or more sensors in the payload bay, how much of the package has been inserted into the payload bay. In some embodiments, the system may compare the detected pattern to a stored pattern corresponding to the object, and may determine the position of the package in the payload bay based on the comparison. For example, based upon the size of the detected pattern, the system may determine a distance of the package from the sensor (e.g., the smaller the detected patter, the farther the object is from the sensor).

In some embodiments, the pattern may include one or more bar codes, 2D barcodes, alphanumeric markings, and/or other commercial or non-commercial identifiers. The system may use these identifiers to identify the object. For example, in the example above, one or more of the printed bars may be a barcode. When the barcode passes in front of the sensor, the sensor transmits information allowing the system to call information corresponding to the barcode. The system can utilize the barcode information to determine the identity of the object, and/or the position of the object within the payload bay. For example, a barcode indicative of the object being completely within the payload bay may be printed on the object such that, when the sensor detects the barcode, the object is completely within the payload bay. As another example, the pattern printed on the object may include a 2D barcode that corresponds to the identity and dimensions of the object. The system can then compare the dimensions of the object to sensor information obtained from one or more of the sensor other sensors to determine the orientation of the object within the payload bay. For example, once the system determines the dimensions of the object, the position of the object within the payload bay can be determined based on readings from one or more sensors (e.g., image sensors, infrared sensors, string potentiometer, etc.) located in the payload bay.

In instances where the system determines that the object does not correspond to an object that the vehicle is to transport, the system may provide an alert. Alternatively or in addition, the system may download a delivery plan that corresponds to the identified object. In instances where the system determines that the object is not seated properly within the payload bay, the system may provide an alert and/or trigger a corrective action to adjust the positioning of the object within the payload bay. The system may use this process to determine the identity and position of more than one object within the payload bay. In response to the system determining that all intended objects are properly seated in the payload bay, the system may present a notification that the vehicle is ready to be deployed. The system may further initiate one or more actions based upon the determination that all intended objects are properly seated within the payload bay, such as closing one or more doors to the payload bay and/or causing the vehicle to initiate delivery of the one or more objects. An object may be considered to properly seated within the payload bay when one or more of the depth of insertion, angle of insertion, positional alignment in the payload bay, orientation of the object within the payload bay is such that the object can be safely transported and delivered by the vehicle.

The position at which an object is properly seated within the payload bay may depend on one or more factors, including the size of the payload bay, the dimensions of the payload bay, the size of the object, the shape of the object, the number of objects being transported by the vehicle, the positions of one or more doors or object manipulation mechanisms within the payload bay. In some embodiments, there may be more than one potential object position at which the object is to be considered by the system to be properly seated. Alternatively or in addition, individual potential object positions may have one or more variance thresholds that correspond to a positional range within which the object is to be considered to by the system to be properly seated. For example, a potential object position may indicate that the object is properly seated so long as it is aligned within 3 degrees of a longitudinal axis of the payload bay.

The techniques and systems described herein may be implemented in a number of ways. Example implementations are provided below with reference to the following figures.

FIG. 1 is a schematic diagram of an illustrative environment 100 that includes a UAV with a payload bay including a sensor configured to determine the identity of an object in the payload bay and verify that the object is properly seated. The environment 100 includes a fulfillment center 102 where a UAV 104 may originate a flight directed to a destination 106 and/or one or more additional object destinations 108, such as a location associated with a recipient of an object 110 transported by the UAV 104.

The UAV 104 may be equipped with one or more payload bays 112 which may include one or more sensors 114. The one or more payload bays 112 may also include one or more doors 116 that open to allow objects to be inserted into the payload bay. The one or more sensor(s) 114 can include a combination of infrared sensors (e.g., time of flight sensors, rangefinders, infrared proximity sensors, linear encoders, etc.), barcode scanners, QR scanners, vision sensors (e.g., optical sensors, cameras, etc.), Hall effect sensors, string potentiometers, micro-switches, ultrasonic proximity sensors, rotary encoders, etc. The object 110 may include a pattern 118, printed on it and/or otherwise affixed or coupled to it. The pattern 118 may include any of bars, shapes, constellations of shapes, barcodes, 2D barcodes, magnetic patterns (i.e., patterns made using magnetic ink, embedded magnetic materials, etc.), embossed and/or raised designs, etc. The pattern 118 may include one or more pattern portions located on different sides of the object 110.

The UAV 104 may be equipped with a number of components to enable the UAV 104 to perform operations prior to and/or during the delivery of the package and to determine the identity of an object in the payload bay and verify that the object is properly seated, based on sensor data from the sensor(s) 114. The components may include a flight controller 120, an object identification module 122, an object position module 124, as well as other components discussed below and also with reference to FIG. 2.

The UAV 104 may travel under control of the flight controller 120 and along a flight path 126 toward the object destination 106. The flight controller 120 may continually or from time to time provide controls to cause change in a velocity of the UAV, a change in heading, a change in altitude, a change in orientation, and/or other changes (e.g., pitch, roll, yaw, hover, etc.). In addition, the UAV 104 may execute different controls based on different flight scenarios, such as a takeoff stage, a transport stage, a package deposit stage, and/or a landing stage of flight.

The object identification module 122 may utilize sensor data from the sensor(s) 114 to determine the identity of the object 110 inserted into the payload bay 112. In some embodiments, the sensor(s) 114 may provide information corresponding to a pattern 118 on the side of the object 110 inserted into the payload bay 112, and based on the pattern 118 the object identification module 122 can determine the identity of the object. For example, the pattern 118 may include one or more barcodes, 2D barcodes, or alphanumeric identifiers that indicate the identity of the object 110. Alternatively or in addition, the pattern 118 may include a distribution of shapes, bars, lines, etc. that enable the object identification module 122 to identify the object 110. In some embodiments the object identification module 122 has access to a database of patterns that are mapped to corresponding objects. In some embodiments the database includes one or more lookup tables or that contain identification information and/or object information associated with a plurality of objects.

The object position module 124 may utilize sensor data from the sensor(s) 114 to determine the position of the object 110 within the payload bay 112. In some embodiments, the sensor(s) 114 may provide information corresponding to the pattern 118 on the side of an object 110 and/or information associated with the boundaries of the object 110. Based on the pattern 118 and/or the boundaries of the object, the position module 124 can determine the position of the object in relation to the payload bay 112 or in relation to features of the payload bay 112. For example, based on the identity of the object 110, the object position model 124 may access a database that indicates how much of pattern 118 would be read by the sensor(s) 114 when the object 110 is properly seated in the payload bay 112. Alternatively or in addition, the database may indicate correlations between one or more portions of the pattern 118 and one or more positions of the object 110 in the payload bay 112. For example, the database may indicate that when one of the sensors 114 detects a third bar within the pattern 118, the object 110 is halfway within the payload bay 112. In some embodiments, the pattern 118 may include one or more barcodes, 2D barcodes, alphanumeric identifiers, etc. that convey positional information.

In some embodiments, the object position module 124 may identify a difference between the pattern detected by sensor(s) 114 and a pattern that corresponds to the object 110, and determine the position of the object 110 based on the difference. For example, the object position module 124 may determine the spatial relationship between the object 110 and the sensor(s) 114 that would create the difference. Alternatively or in addition, the object position module 124 may determine a position of the object based on time of flight measurements, sonic proximity readings, physical sensor manipulation (e.g., via string potentiometers, microswitches, rotary encoders), etc.

Figure 2:
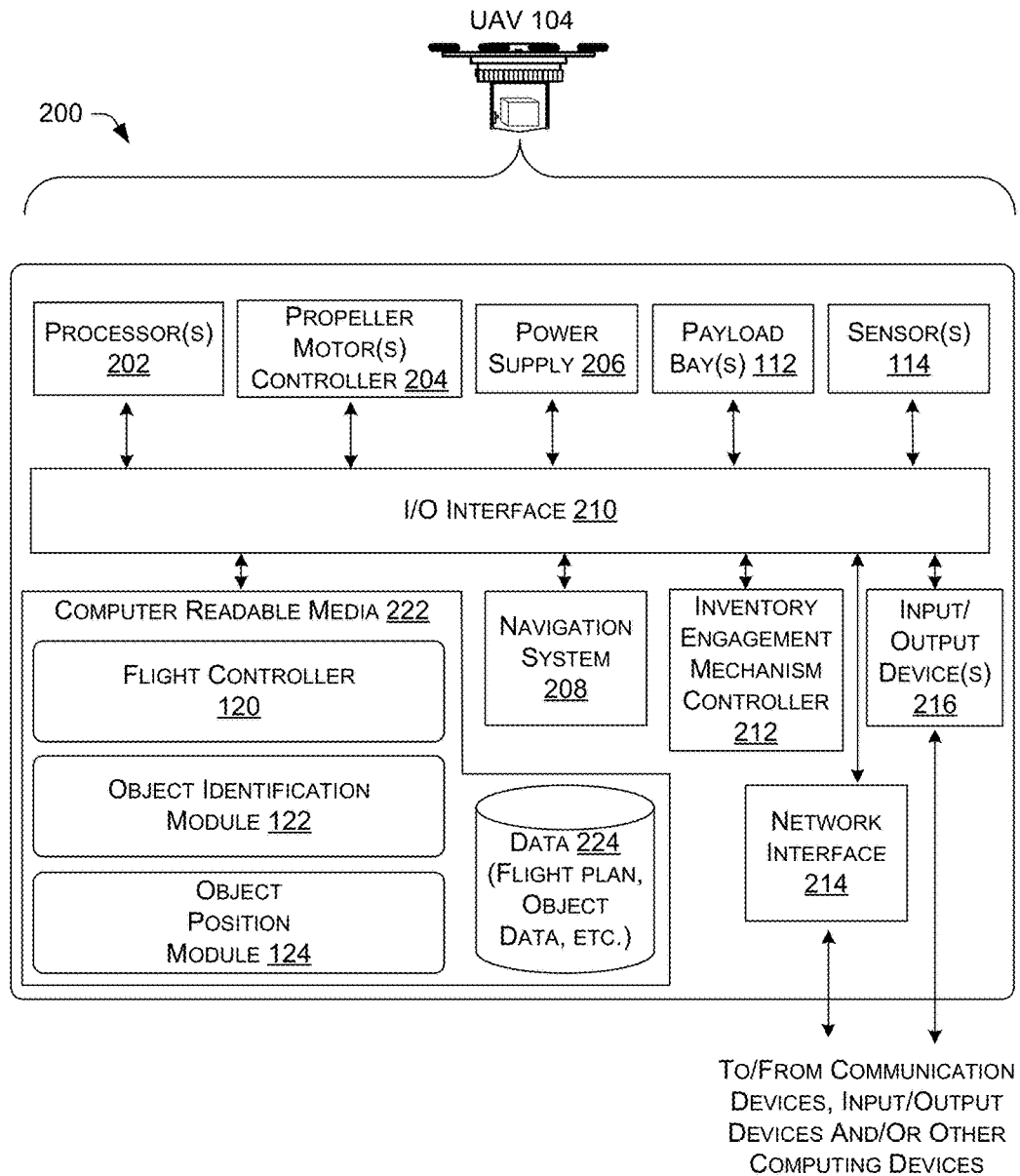
FIG. 2 is a block diagram of an illustrative UAV architecture of the UAV shown in FIG. 1.

FIG. 2 is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 222 via an input/output (I/O) interface 210. The UAV architecture 200 may also include a propeller motor controller 204, power supply module 206, the one or more payload bay(s) 112 which may include the one or more sensors 114, and/or a navigation system 208. The UAV architecture 200 may further include an inventory engagement mechanism controller 212 to interact with the object 110 in the payload bay 112, a network interface 214, and one or more input/output devices 216.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 222 may be configured to store executable instructions/modules, data, flight paths, and/or data items accessible by the processor(s) 202. In various implementations, the non-transitory computer readable media 222 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 222 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 214.

In one implementation, the I/O interface 210 may be configured to coordinate I/O traffic between the processor(s) 202, the non-transitory computer readable media 222, and any peripheral devices, the network interface or other peripheral interfaces, such as input/output devices 216. In some implementations, the I/O interface 210 may perform any necessary protocol, timing or other data transformations to convert data signals from one component (e.g., non-transitory computer readable media 222) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 222, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory, such as the package 108. For example, when the UAV is positioned over a level surface at a delivery location, the inventory engagement mechanism controller 212 may provide an instruction to a motor that controls the inventory engagement mechanism to release the package 108.

As shown in FIG. 2, the network interface 214 may be configured to allow data to be exchanged between the UAV architecture 200, other devices attached to a network, such as other computer systems, and/or with UAV control systems of other UAVs. For example, the network interface 214 may enable wireless communication between numerous UAVs. In various implementations, the network interface 214 may support communication via wireless general data networks, such as a Wi-Fi network. For example, the network interface 214 may support communication via telecommunications networks such as cellular communication networks, satellite networks, and the like.

The input/output devices 218 may, in some implementations, include accelerometers and/or other input/output devices commonly used in aviation. Multiple input/output devices 216 may be present and controlled by the UAV architecture 200. One or more of these sensors may be utilized to assist in landings as well as avoiding obstacles during flight.

In some embodiments, the computer readable media 222 may store the flight controller 120, object identification module 122, and the object position module 124. The components may access and/or write data 224, which may include flight plan data, destination data, object data, and pattern data, and so forth. The operations of the flight controller 120, object identification module 122, and the object position module 124 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 104 is discussed below.

Although FIGS. 1 and 2 depict a UAV, other vehicles may deploy the payload bay(s) 112 and the sensor(s) 114 described herein, such as land vehicles (cars, trucks, etc.), marine vehicles (boats, ships, etc.), and/or other types of aircraft.

Figure 3:
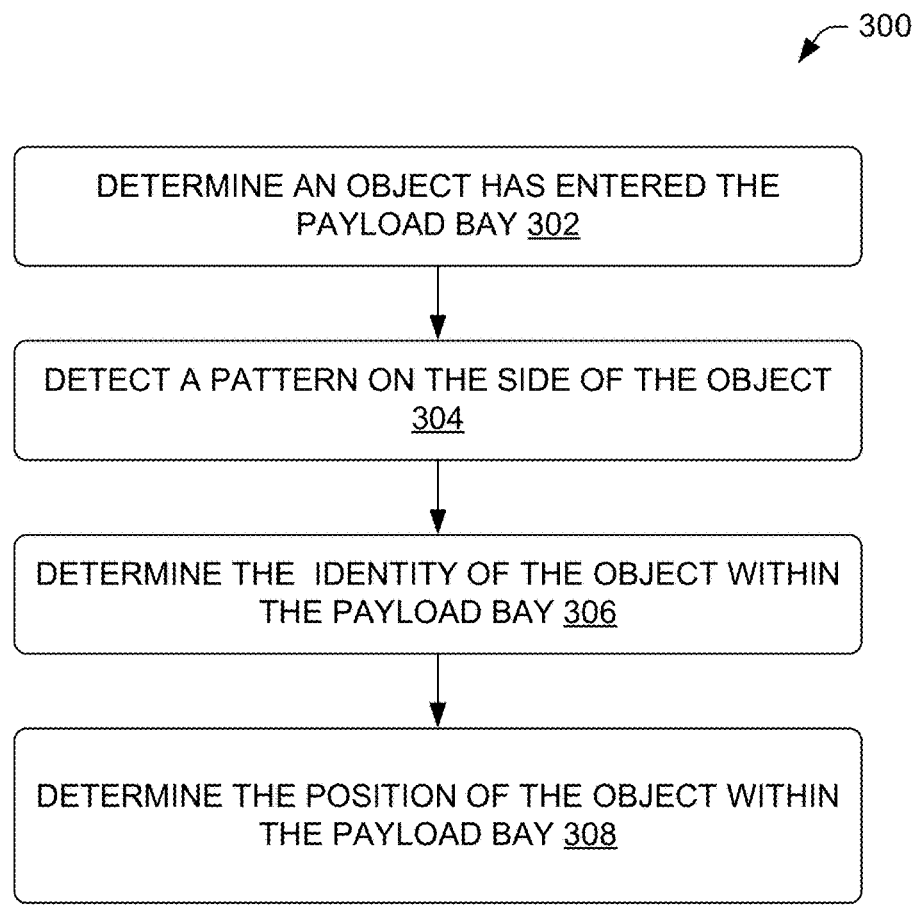
FIG. 3 is a flow diagram of an illustrative process to utilize a sensor to determine the identity of an object being transported in a payload bay of a vehicle and verify that the object is properly seated.
Figure 4:
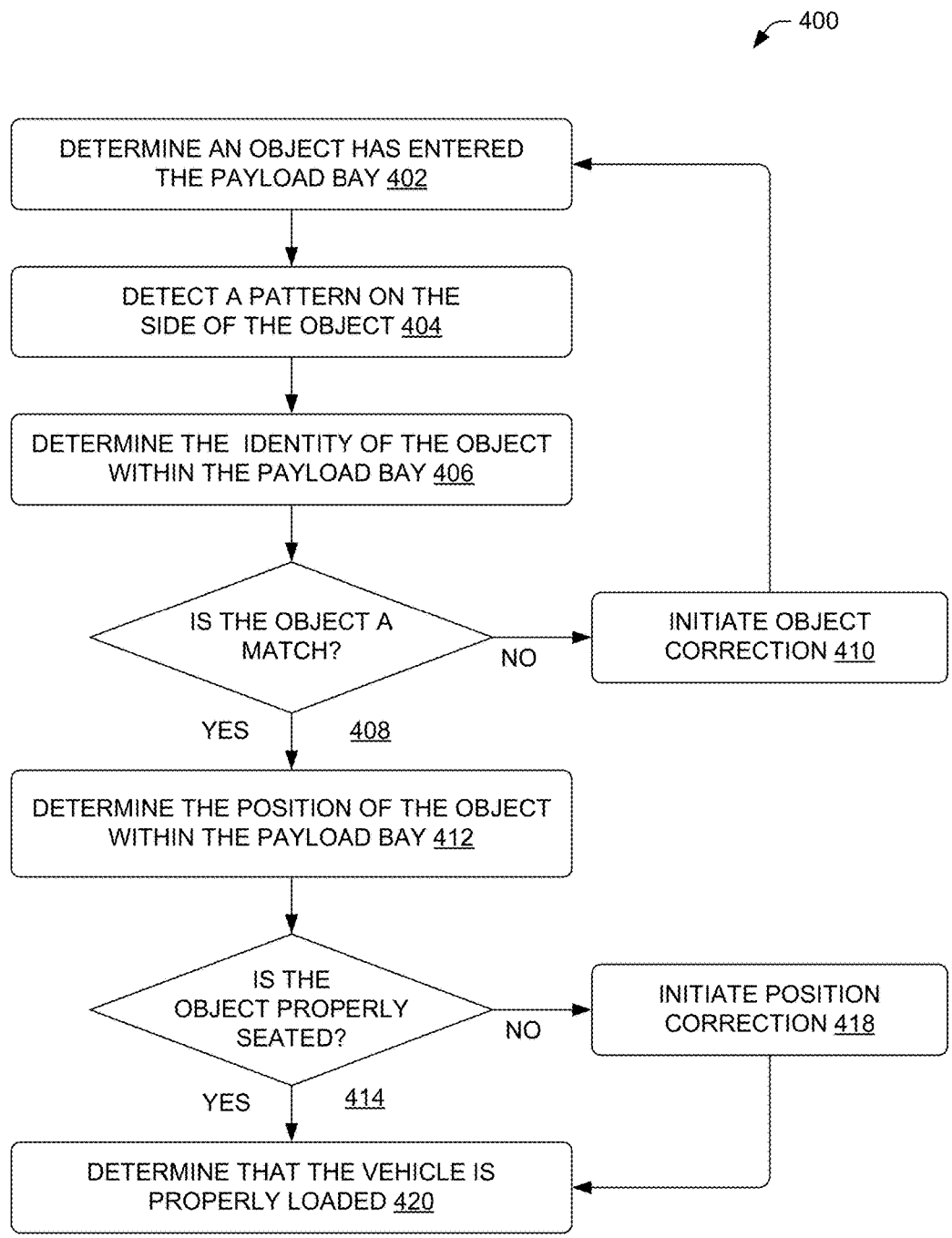
FIG. 4 is a flow diagram of an illustrative process for loading a vehicle using a sensor configured to determine the identity of an object being transported in a payload bay and verify that the object is properly seated.

FIGS. 3-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to utilize a sensor to determine the identity of an object being transported in a payload bay of a vehicle and verify that the object is properly seated within the payload bay. The process 300 may be implemented in the environment 100 and by the UAV architecture 200 described above, or in other environments and architectures.

At 302, the UAV 104 determines that an object has entered the payload bay of a vehicle. In some embodiments, UAV 104 may determine an object has entered the payload bay based on sensor data captured by the sensor 114. Alternatively or in addition, the UAV 104 may determine the object has entered the payload bay based upon an indication received from a network resource, and/or input received from an operator. For example, an operator loading the UAV 104 may input an indication that an object has been loaded or is about to be loaded into the payload bay via a user interface presented on the display of one of the UAV 104 or a network available computing resource. The UAV 104 may also determine that the object has entered the payload bay based on a door to the payload bay being opened.

At 304, a pattern is detected, by the sensor(s) 114, on the side of the object. The sensor(s) 114 may detect one or more patterns that are printed on and/or otherwise affixed or coupled to one or more sides of the object. The one or more patterns may a combination of bars, shapes, constellations of shapes, barcodes, 2D barcodes, magnetic patterns (i.e., patterns made using magnetic ink, embedded magnetic materials, etc.), embossed and/or raised designs, etc.

At 306, the object identification module 122 determines the identity of the object within the payload bay. In some embodiments, the object identification module 122 may determine, based on data transmitted by the one or more sensors, the identity of the object within the payload bay. For example, the one or more sensors may provide information corresponding to the pattern on the object inserted into the payload bay to the object identification module 122, and based on the pattern the object identification module 122 may determine the identity of the object. The pattern may include one or more barcodes, 2D barcodes, or alphanumeric identifiers that indicate the identity of the object. Alternatively or in addition, the pattern may include a distribution of shapes, bars, lines, etc. that enable the object identification module 122 to identify the object. In some embodiments the object identification module 122 may access a database containing a data mapping of one or more patterns to corresponding objects.

At 308, the object position module 124 determines the position and/or orientation of the object within the payload bay. In some embodiments, the object position module 124 may determine the position of the object within the payload bay based on data transmitted by the one or more sensors. For example, the one or more sensors may provide information corresponding to a pattern detected on the side of the object and/or information identifying the boundaries of the object to the object position module 124. Based on the pattern and/or the boundaries, the object position module 124 may determine the position of the object. For example, the pattern may include one or more barcodes, 2D barcodes, alphanumeric identifiers, etc. that convey positional information. For example, the pattern may include an alphanumeric identifier that indicates that the object is properly seated in the payload bay (e.g., the word "SEATED" may be located on the object so that it is detected by sensor(s) 114 when the object is properly seated within the payload bay.). In some embodiments, the pattern may include a barcode that corresponds to an identification of the position of the barcode on the object and/or in relation to the pattern. For example, the pattern may include a barcode that corresponds to information that identifies the barcode as being the third barcode out of seven barcodes. The object position module 124 may determine the position of the object within the payload bay, based on this information, the identity of the object, the dimensions or type of the payload bay, or a combination thereof. In this way, for a first payload bay having a first set of dimensions, an object position module 124 may determine that sensor detecting the barcode indicates that the object is properly seated, wherein for a second payload bay having a second set of dimensions, the object position module 124 may determine that sensor detecting the barcode indicates that the object is not properly seated. Alternatively or in addition, based on the identity of the object, the object position module 124 may access a database that indicates how much of pattern would be detected by the one or more sensors when the object is properly seated in the payload bay. Alternatively or in addition, the database may indicate the portion of the pattern corresponds to the object being properly seated in the payload bay (i.e., when the sensors detect the indicated portion of the pattern, the object position module 124 can determine that the object is properly seated).

In some embodiments, the object position module 124 may identify a difference between the pattern detected by the one or more sensors and a pattern that the database indicates corresponds to the object. The object position module 124 may then determine the spatial relationship between the object and the one or more sensors that would create the difference. Alternatively or in addition, the object position module 124 may determine position of the object based on time of flight measurements, sonic proximity readings, physical sensor manipulation (e.g., via string potentiometers, micro-switches, rotary encoders), etc. In some embodiments, as the object is inserted into the payload bay, the object may cause a length of string to be drawn out of a string potentiometer. Then, based on the identity of the object, the object position module 124 may determine the dimensions of object, and/or a particular amount of string that is to be let out when the object is properly seated in the payload bay. In this way, the object position module 124 may determine, based on an amount of string let out by the string potentiometer, that object is properly seated in the payload bay 112. Thus, the object position module 124 may identify the position of the object based upon the length of string. Moreover, when the object is to be removed from the payload bay, the UAV may cause the string potentiometer to retract the string, thus propelling the object from the payload bay.

FIG. 4 is a flow diagram of an illustrative process 400 to load a vehicle using a sensor configured to determine the identity of an object being transported in a payload bay and verify that the object is properly seated. The process 400 may be implemented in the environment 100 and by the UAV architecture 200 described above, or in other environments and architectures.

At 402, the UAV 104 determines that an object has entered the payload bay of a vehicle. In some embodiments, UAV 104 may determine an object has entered the payload bay based on sensor data captured by the sensor 114. Alternatively or in addition, the UAV 104 may determine the object has entered the payload bay based upon an indication received from a network resource, and/or input received from an operator. For example, an operator loading the UAV 104 may input an indication that an object has been loaded or is about to be loaded into the payload bay via a user interface presented on the display of one of the UAV 104 or a network available computing resource. The UAV 104 may also determine that the object has entered the payload bay based on a door to the payload bay being opened.

At 404, a pattern is detected, by the sensor(s) 114, on the side of the object. The sensor(s) 114 may detect one or more patterns that are printed on and/or otherwise affixed or coupled to one or more sides of the object. The one or more patterns may a combination of bars, shapes, constellations of shapes, barcodes, 2D barcodes, magnetic patterns (i.e., patterns made using magnetic ink, embedded magnetic materials, etc.), embossed and/or raised designs, etc.

At 406, the object identification module 122 determines the identity of the object within the payload bay. In some embodiments, the object identification module 122 may determine, based on data transmitted by the one or more sensors, the identity of the object within the payload bay. For example, the one or more sensors may provide information corresponding to the pattern on the object inserted into the payload bay to the object identification module 122, and based on the pattern the object identification module 122 may determine the identity of the object. The pattern may include one or more barcodes, 2D barcodes, or alphanumeric identifiers that indicate the identity of the object. Alternatively or in addition, the pattern may include a distribution of shapes, bars, lines, etc. that enable the object identification module 122 to identify the object. In some embodiments the object identification module 122 may access a database containing a data mapping of one or more patterns to corresponding objects.

At operation 408, it is determined whether the object matches the object that the UAV is intended to transport. In some embodiments, the UAV may determine whether the object matches an object included in a delivery schedule and/or delivery inventory located on the UAV or accessible via a network resource.

If the answer at operation 408 is "no" (it is determined that the object does not match the object that the UAV 104 is intended to transport), then the process moves to operation 410, and an object correction process is initiated. For example, one or more of a message, an indicator (i.e., alarm, popup interface, light, message, etc.) may be provided to an operator. The UAV 104 may also initiate a process of removing the object from the payload bay. Alternatively, the object correction process may include downloading a new delivery plan and/or updating the transport instructions based on the object in the payload bay. The process then continues to operation 402 where the UAV 104 determines that a new object has entered the payload bay.

If the answer at operation 408 is "yes", then the process moves to operation 412, and the object position module 124 determines the position and/or orientation of the object within the payload bay. In some embodiments, the object position module 124 may determine the position of the object within the payload bay based on data transmitted by the one or more sensors. For example, the one or more sensors may provide information corresponding to a pattern detected on the side of the object and/or information identifying the boundaries of the object to the object position module 124. Based on the pattern and/or the boundaries, the object position module 124 may determine the position of the object. For example, the pattern may include one or more barcodes, 2D barcodes, alphanumeric identifiers, etc. that convey positional information. In some embodiments, the object position module 124 may identify a distortion between the pattern detected by the one or more sensors and a pattern that the database indicates corresponds to the object. The object position module 124 may then determine the spatial relationship between the object and the one or more sensors that would create the distortion. Alternatively or in addition, the object position module 124 may determine position of the object based on time of flight measurements, sonic proximity readings, physical sensor manipulation (e.g., via string potentiometers, micro-switches, rotary encoders), etc. For example, as the object is inserted into the payload bay, the object may cause a length of string to be drawn out of a string potentiometer. Thus, the object position module 124 may identify the position of the object based upon the length of string. Moreover, when the object is to be removed from the payload bay, the object position module 124 may cause the string potentiometer to retract the string, thus propelling the object from the payload bay.

At operation 414, it is determined whether the object is seated properly in the payload bay. If the answer at operation 408 is "no" (it is determined that the object does not match the object that the UAV 104 is intended to transport), then the process moves to operation 418, and a position correction process is initiated. For example, one or more of a message, an indicator (i.e., alarm, popup interface, light, message, etc.) may be provided to an operator to indicate that the position of the object is incorrect. The UAV 104 may also initiate a process of adjusting the position of the object from the payload bay. For example, based on the determined position of the object, the UAV 104 may trigger one or more mechanisms to manipulate the object (i.e., rotate, push, pull, or otherwise move the object) so that it is properly seated. Once the object in properly seated in the payload bay, the process continues to operation 420.

If the answer at operation 408 is "yes", then the process moves to operation 420, and the object position module 124 determines that the vehicle is properly loaded. In response to the UAV 104 being properly loaded, one or more of a message, an indicator (i.e., alarm, popup interface, light, message, etc.) may be provided to an operator to indicate that the UAV 104 is properly loaded. Alternatively or in addition, upon determining that the vehicle is properly loaded, the UAV 104 may initiate the delivery of the object. In embodiments where the UAV 104 transports multiple objects, process 400 may be repeated multiple times, once for each object that is to be transported by the UAV 104.

FIG. 5 is a flow diagram of an illustrative process 500 to load a vehicle and deliver one or more objects using a sensor configured to determine the identity of each object being transported in a payload bay and verify that each object is properly seated. The process 500 may be implemented in the environment 100 and by the UAV architecture 200 described above, or in other environments and architectures.

At 502, the UAV 104 determines that an object has entered the payload bay of a vehicle. In some embodiments, UAV 104 may determine an object has entered the payload bay based on sensor data captured by the sensor 114. Alternatively or in addition, the UAV 104 may determine the object has entered the payload bay based upon an indication received from a network resource, and/or input received from an operator. For example, an operator loading the UAV 104 may input an indication that an object has been loaded or is about to be loaded into the payload bay via a user interface presented on the display of one of the UAV 104 or a network available computing resource. The UAV 104 may also determine that the object has entered the payload bay based on a door to the payload bay being opened.

At 504, a pattern is detected, by the sensor(s) 114, on the side of the object. The sensor(s) 114 may detect one or more patterns that are printed on and/or otherwise affixed or coupled to one or more sides of the object. The one or more patterns may a combination of bars, shapes, constellations of shapes, barcodes, 2D barcodes, magnetic patterns (i.e., patterns made using magnetic ink, embedded magnetic materials, etc.), embossed and/or raised designs, etc.

At 506, the object identification module 122 determines the identity of the object within the payload bay. In some embodiments, the object identification module 122 may determine, based on data transmitted by the one or more sensors, the identity of the object within the payload bay. For example, the one or more sensors may provide information corresponding to the pattern on the object inserted into the payload bay to the object identification module 122, and based on the pattern the object identification module 122 may determine the identity of the object. The pattern may include one or more barcodes, 2D barcodes, or alphanumeric identifiers that indicate the identity of the object. Alternatively or in addition, the pattern may include a distribution of shapes, bars, lines, etc. that enable the object identification module 122 to identify the object. In some embodiments the object identification module 122 may access a database containing a data mapping of one or more patterns to corresponding objects.

At 508, the object position module 124 determines the position and/or orientation of the object within the payload bay. In some embodiments, the object position module 124 may determine the position of the object within the payload bay based on data transmitted by the one or more sensors. For example, the one or more sensors may provide information corresponding to a pattern detected on the side of the object and/or information identifying the boundaries of the object to the object position module 124. Based on the pattern and/or the boundaries, the object position module 124 may determine the position of the object. For example, the pattern may include one or more barcodes, 2D barcodes, alphanumeric identifiers, etc. that convey positional information. Alternatively or in addition, based on the identity of the object, the object position module 124 may access a database that indicates how much of pattern would be detected by the one or more sensors when the object is properly seated in the payload bay. Alternatively or in addition, the database may indicate the portion of the pattern corresponds to the object being properly seated in the payload bay (i.e., when the sensors detect the indicated portion of the pattern, the object position module 124 can determine that the object is properly seated).

At operation 510, it is determined whether another object is detected as entering the payload bay. In some embodiments, the UAV 104 may determine whether an additional object is entering the payload bay based on sensor data from one or more sensors, one or more inputs, or one or more indications received from a network accessible resource.

If the answer at operation 510 is "yes" (it is determined that another object has entered the payload bay), then the process returns to operation 504. If the answer at operation 510 is "no" (it is determined that no other objects have entered the payload bay), then the process moves to operation 512 and is the UAV 104 determines that the vehicle is properly loaded. In response to the UAV 104 being properly loaded, one or more of a message, an indicator (i.e., alarm, popup interface, light, message, etc.) may be provided to an operator to indicate that the UAV is properly loaded. Alternatively or in addition, upon determining that the vehicle is properly loaded, the UAV 104 may initiate the delivery of the object.

At 514, the UAV 104 determines that the vehicle is at the object drop-off location. In some embodiments, the UAV 104 may determine that it is at the object drop-off location, based on performance of a scenario, such as a landing scenario that involves identification of an objective marker (e.g., a drop zone marker, etc.) or of another type of scenario executed by the flight controller 120 of the UAV 104.

At 516, the UAV 104 causes the object to be expelled from the payload bay. In some embodiments, the UAV 104 may trigger one or more mechanisms to remove or lower the object from the payload bay so that it is deposited at the drop-off location. For example, the UAV 104 may cause a string potentiometer to retract the string, thus propelling the object from the payload bay. Alternatively or in addition, the UAV 104 utilize gravity to remove the object from the payload bay.

At 518, the pattern is detected, by the sensor(s) 114, on the side of the object. In some embodiments, the sensor(s) 104 may detect the pattern on the side of the object as the object is lowered out of the payload bay. The object position module 124 may track the position of the object as it is lowered based on the portion of the pattern that is currently being detected by the sensor(s) 114.

At 520, the object identification module 122 determines the identity of the object being expelled from the payload bay. In some embodiments, the object identification module 122 may determine, based on data transmitted by the one or more sensors, the identity of the object being expelled from the payload bay. For example, the one or more sensors may provide information corresponding to the pattern on the object as the object leaves the payload bay, and based on the pattern the object identification module 122 may determine the identity of the object. In some embodiments the object identification module 122 may access a delivery plan, and determine that the object being expelled matches the object that is scheduled to be delivered to the drop-off location.

At 522, the UAV 104 determines that the object is no longer within the payload bay. For example, a sensor of the sensor(s) 114 may indicate that the object has completely exited the payload bay. In some embodiments, the object position module 124 may also determine that the object is no longer within the payload bay based on the pattern. For example, as the object is expelled from the payload bay, the one or more sensors may provide information corresponding to a pattern detected on the side of the object and/or information identifying the boundaries of the object to the object position module 124. Based on the pattern and/or the boundaries, the object position module 124 may determine the position of the object as the object is expelled from the payload bay. Upon determining that the object is no longer within the payload bay, the UAV 104 may cause the mechanism to stop lowering the object, close the doors to the payload bay, etc.

At operation 524, the UAV 104 determines whether another object is in the payload bay. In some embodiments, the UAV 104 may determine whether an additional object is entering the payload bay based on sensor data from sensor(s) 114, a delivery plan, etc.

If the answer at operation 524 is "yes" (it is determined that another object is in payload bay), then the process returns to operation 514. If the answer at operation 524 is "no" (it is determined that no other objects are in the payload bay), then the process moves to operation 526 and the UAV 104 returns to the fulfillment center.

FIGS. 6A-6E are schematic diagrams of different embodiments of a sensor system 600 configured to determine the identity of an object being transported in a payload bay and verify that the object is properly seated. In different embodiments, elements 602-614 of FIGS. 6A-6E may occur in various combinations. Additionally, information that is described as corresponding to any of individual elements 602-614 of pattern 118 may be attributed to any different individual element 602-614.

Figure 6B:
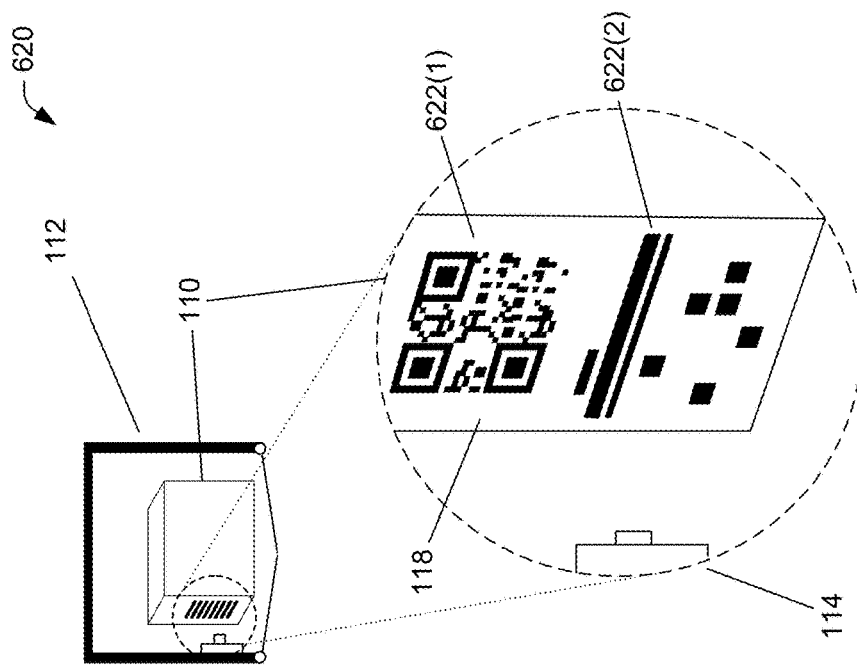
FIG. 6B is a schematic diagram of an illustrative system that uses a sensor configured to use a two-dimensional (2D) barcode to determine the identity of an object being transported in a payload bay and verify that the object is properly seated.
Figure 6A:
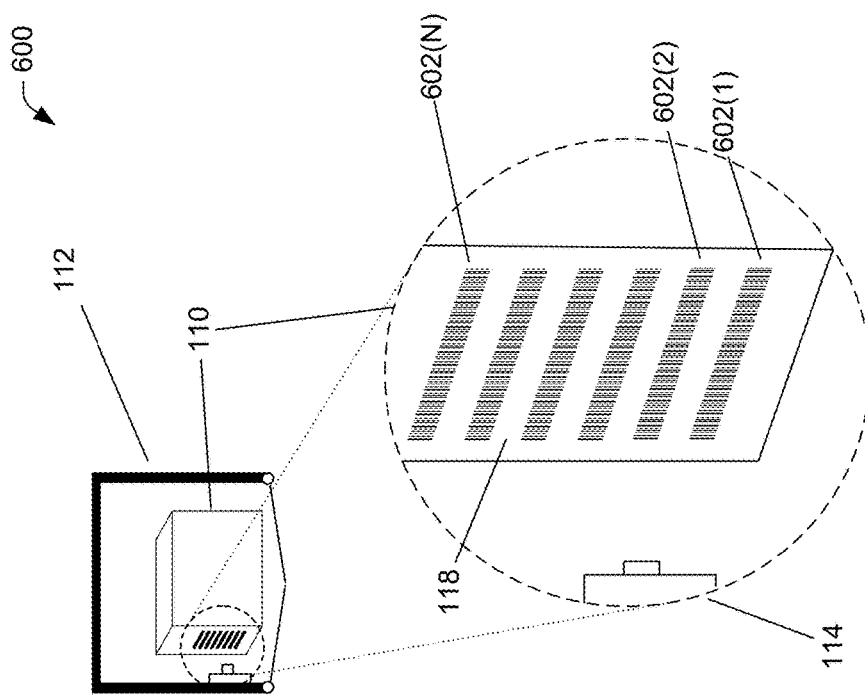
FIG. 6A is a schematic diagram of an illustrative system that uses a sensor configured to use one or more barcodes to determine the identity of an object being transported in a payload bay and verify that the object is properly seated.

FIG. 6A shows an enlarged view 600 of the payload bay 112 where the pattern 118 includes one or more barcodes 602(1), 602(2) . . . 602(N). When a barcode 602 passes in front of the sensor, the sensor 114 transmits information allowing the system to call information corresponding to the barcode 602. The system can utilize the barcode information to determine the identity of the object 110, and/or the position of the object 110 within the payload bay 112. In some embodiments, pattern 118 may include a barcode 602(2) indicative of the object 110 being completely within the payload bay 112, the barcode 602(2) being positioned on the object such that, when sensor 114 detects the barcode 602(2), the object 110 is completely within the payload bay 112. For example, the pattern may include an alphanumeric identifier that indicates that the object is properly seated in the payload bay (e.g., the word "Stop" may be located on the object so that it is detected by sensor(s) 114 when the object is properly seated within the payload bay.).

In some embodiments, the pattern 118 may include a barcode 602(2) that corresponds to an identification of the position of the barcode 602(2) on the object 110 and/or in relation to the pattern 118. For example, the barcode 602(2) may correspond to information that identifies the barcode 602(2) as being the fifth barcode out of six barcodes. The system may then determine the position of the object within the payload bay, based on this information, the identity of the object, the dimensions or type of the payload bay, or a combination thereof. In some embodiments, pattern 118 may include a one or more identical barcodes 602(1), 602(2) . . . 602(N), that convey identical information. For example, the identical information may identify the identity of the object 110. Once the identity of the object is known, the system may determine a number of barcodes 602(1), 602(2), . . . 602(N) that are to be detected by the sensor(s) 114 before the object 110 is properly seated in the payload bay 112. In some embodiments, the number of barcodes 602(1), 602(2), . . . 602(N) that are to be counted will depend on the dimensions of the payload bay 112, one or more other objects being transported, or a combination thereof.

FIG. 6B shows an enlarged view 620 of payload bay 112 where pattern 118 includes one or more 2D barcodes 622(1). When the 2D barcode 622(1) passes in front of the sensor(s) 114, the sensor (s) 114 transmit information allowing the system to call information corresponding to the 2D barcode 622(1). For example, the 2D barcode (s) 114 may correspond to the identity and dimensions of the object 110. The system can then compare the dimensions of the object 110 to sensor information obtained from the sensor(s) 114 to determine the orientation of the object 110 within the payload bay 112. For example, once the system knows the dimensions of the object, the position of the object 110 within the payload bay 112 can be determined based on readings from the sensor(s) 114 located in the payload bay 112. Additionally, the sensor(s) 114 may be positioned within payload bay 112 such that the 2D barcode 622(1) is readable when the object 110 is properly seated in the payload bay 112. In this way, when sensor(s) 114 scan the 2D barcode 622(1), the system can not only call information corresponding to the 2D barcode 622(1) to identity the object 110, but the system can also determine from the information that the object 110 is properly seated in the payload bay 112.

In some embodiments the 2D barcode 622(1) may correspond to information that identifies one or more remaining pattern portions 622(2) of the pattern 118. For example, the 2D barcode 622(1) may correspond to information that indicates a particular portion of the remaining pattern portions 622(2) that corresponds to the object 110 being properly seated in the payload bay 112 (i.e., when the sensor(s) 114 detects the particular portion of the remaining pattern portions 622(2), the system can determine that the object 110 is properly seated in the payload bay 112). Alternatively or in addition, where the remaining portions 622(2) comprise a series of elements (e.g., bars, shapes, etc.), the 2D barcode 622(1) may correspond to information that indicates a number of elements that are to be detected when the object 110 is properly seated in the payload bay 112 (e.g., when sensor(s) 114 detect a third bar, the object 110 is properly seated).

In some embodiments, based on the 2D barcode 622(1) the system may identify the pattern that is associated with the object 110. The system may then identify a difference between the pattern that is associated with the object 110 and one or more of the 2D barcode 622(1) or remaining pattern portions 622(2) that have been detected by the sensor(s) 114. The system may then determine the spatial relationship between the object 110 and the sensor(s) 114 that would create the difference.

Figure 6D:
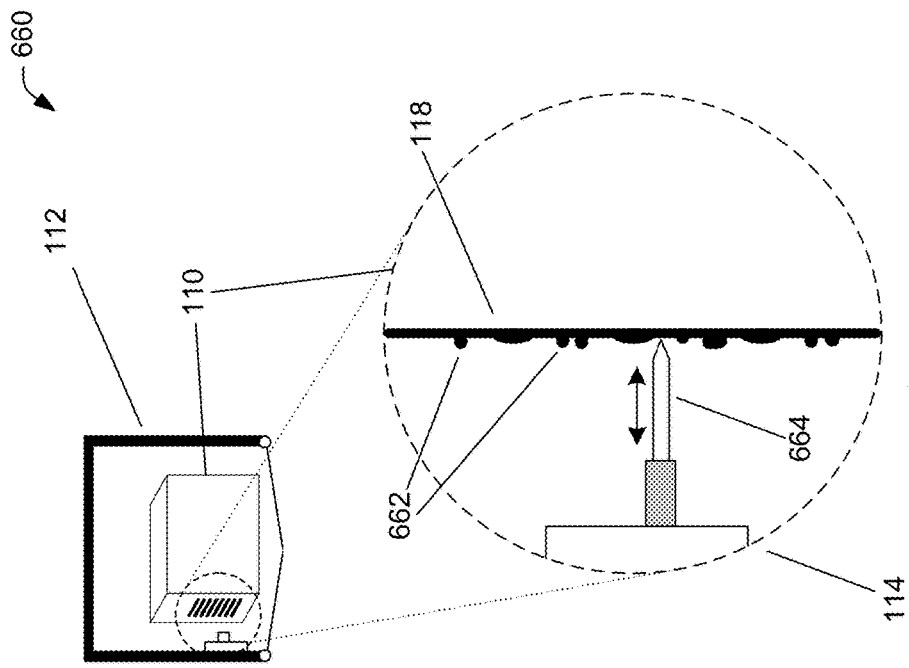
FIG. 6D is a schematic diagram of an illustrative system that uses a micro-switch sensor to determine the identity of an object being transported in a payload bay and verify that the object is properly seated.
Figure 6C:
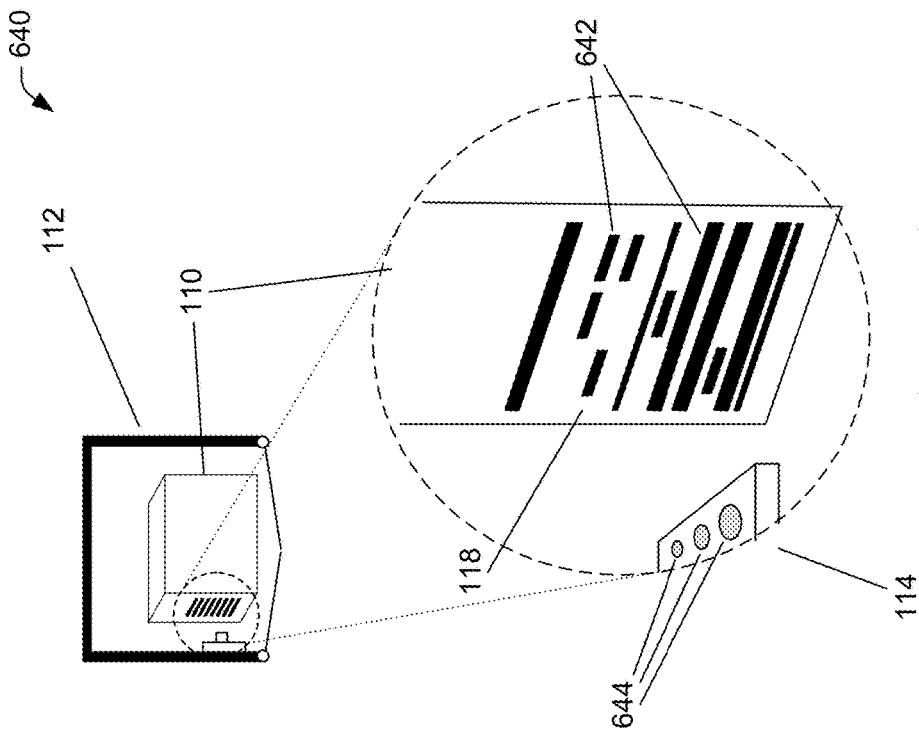
FIG. 6C is a schematic diagram of an illustrative system that uses a Hall effect sensor configured to determine the identity of an object being transported in a payload bay and verify that the object is properly seated.

FIG. 6C shows an enlarged view 640 of payload bay 112 where the pattern 118 corresponds to a magnetic pattern 642 printed or otherwise affixed or coupled to object 110, and wherein sensor(s) 114 include one or more Hall effect sensors 644. The magnetic pattern 642 may be printed on the object 110 using made using magnetic ink, may be made up of magnetic materials embedded in the object and/or a label, or a combination thereof. As the object 110 passes by the sensor(s) 114, the Hall effect sensor 644 detects variations in magnetic fields caused by the magnetic pattern 642. Specifically, the Hall effect sensor 644 may change an output voltage in response to a detected change in magnetic field. In some embodiments, the magnetic pattern 642 may be a magnetic strip coupled to the object, wherein the magnetic strip includes magnetically encoded information.

FIG. 6D shows an enlarged view 660 of payload bay 112 where the pattern 118 corresponds to an embossed pattern 662 printed on or otherwise affixed or coupled to object 110, and wherein the sensor(s) 114 includes a micro-switch 664. As object 110 is inserted into the payload bay 112, the embossed pattern 662 (e.g., ribbed pattern, braille, raised patterning, etched patterning, or a combination thereof) may come into contact with the micro-switch 664. As the object 110 moves passed the sensor(s) 114, the raised and lowered portions of the embossed pattern 662 may cause the micro-switch 664 to move in a pattern of movement. The system may then use the pattern of movement to identify the identity and position of the object 110 within the payload bay. In some embodiments, the sensor(s) 114 may include a roller, which contacts the pattern 118 and detects the embossed pattern 662 as the object 110 is inserted into the payload bay 112.

In some embodiments, sensor(s) 114 may include a proximity capacitance sensor, an acoustic sensor, and or other sensor means to detect physical patterns on the object 110. For example, where the sensor(s) 114 include a proximity capacitance or acoustic sensor, the sensor(s) may be able to determine the embossed pattern 662 on the object 110 without coming into contact with the object 110.

Figure 6E:
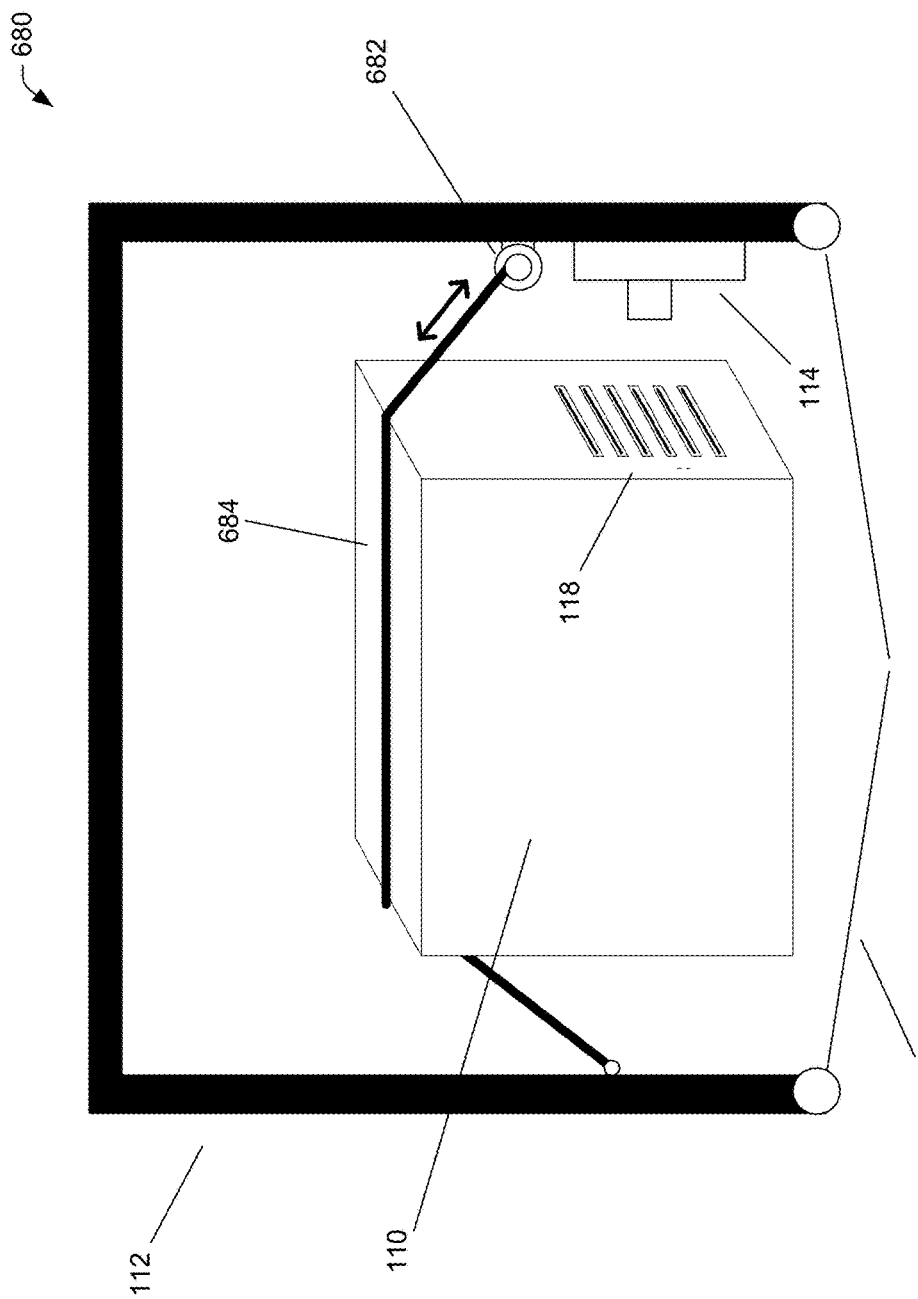
FIG. 6E is a schematic diagram of an illustrative system that uses a string potentiometer to verify that the object is properly seated.

FIG. 6E shows an enlarged view 680 of payload bay 112 where the pattern 118 is printed on or otherwise affixed or coupled to object 110, and wherein the sensor(s) 114 includes a string potentiometer 682. As object 110 is inserted into the payload bay 112, the string potentiometer 682 may let out a length of sting 684 in relation to the distance the object 110 has been inserted into the payload bay 112. For example, string 684 may be anchored to a side of the payload bay 112, and as the object 110 is inserted into the payload bay 112, the object 110 comes into contact with the string 684, and the insertion of the object 110 causes the string potentiometer 682 to let out a length of string 684 in proportion to the distance that the object 110 has been inserted into the payload bay 112. In some embodiments, the system may determine, based on pattern 118, the identity of object 110. The system may then determine the dimensions of object 110, and/or a particular amount of string that is to be let out when the object 110 is properly seated in the payload bay 112. Then, once the system determines that the amount of string 684 let out by the string potentiometer corresponds to the particular amount of string, the system may determine that object 110 is properly seated in the payload bay 112. In some embodiments, the system may cause the string potentiometer 682 to retract a length of string 684 to propel the object 110 from the payload bay 112.

Figure 6F:
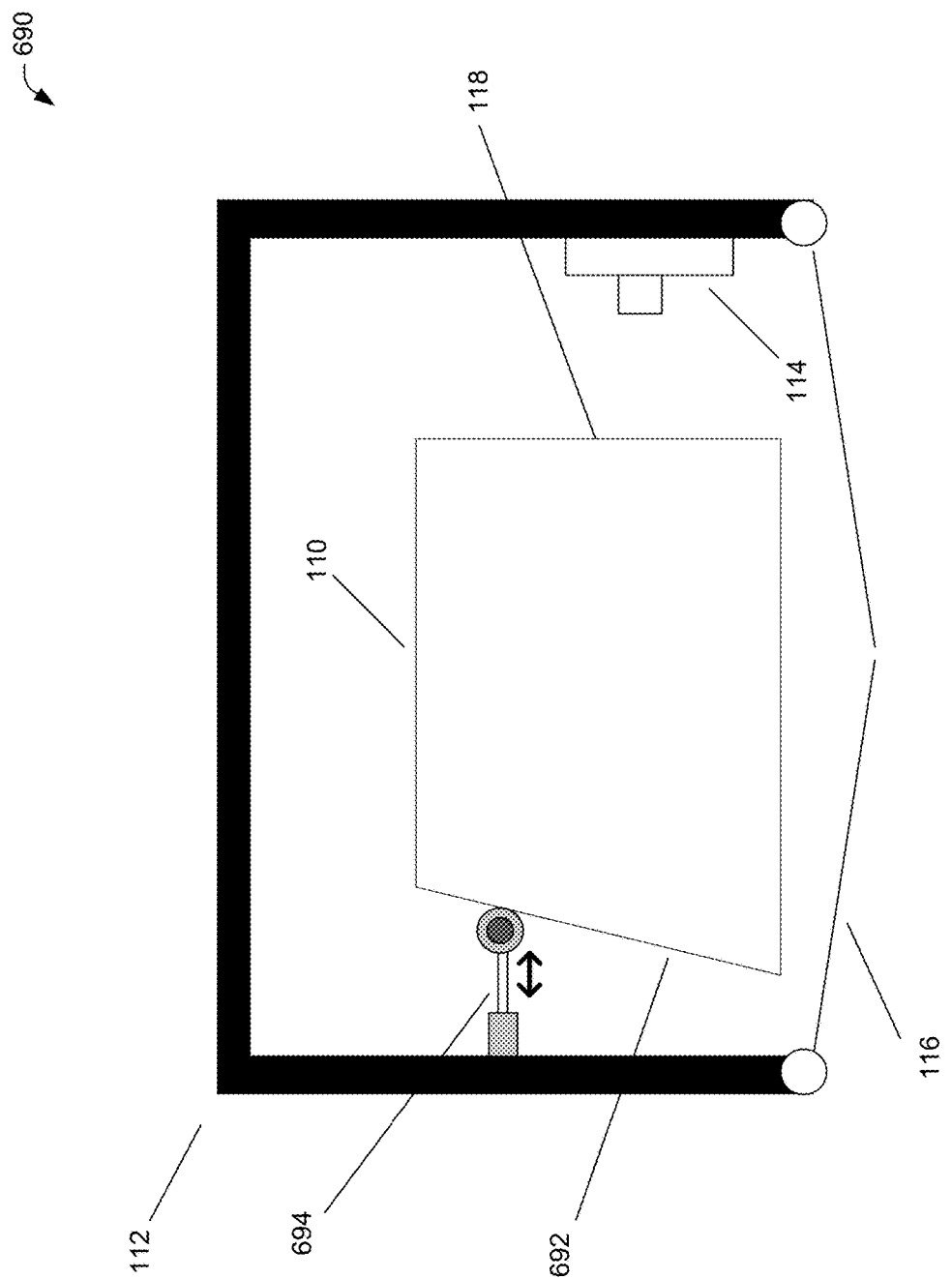
FIG. 6F is a schematic diagram of an illustrative system that uses a rotary encoder and a sloped side of an object to verify that the object is properly seated.

FIG. 6F shows an enlarged view 690 of payload bay 112 where the pattern 118 is printed on or otherwise affixed or coupled to object 110, where the object has a side having a known slope 692, and wherein the sensor(s) 114 includes a rotary encoder 694. As object 110 is inserted into the payload bay 112, the side of the object 110 having the known slope 692 comes in contact with rotary encoder 694. As the object 110 progresses further into the payload bay 112, the side of the object 110 having the known slope 692 causes the rotary encoder 694 to retract or extend. Depending on the amount that the rotary encoder 694 has retracted or extended, and based on the known slope 692, the system may determine the position of the object 110 within the payload bay 112. For example, the system may determine that because the rotary encoder 694 has retracted 1.8 cm, and based on the system knowing that the slope of the object 110 being 1 cm/20 cm, the system may determine that the object 110 has been inserted 38 cm into the payload bay 112.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
   a payload bay;
   a payload image sensor located proximate to the payload bay and configured to capture imagery of at least a portion of the payload bay;
   one or more processors; and
   memory storing computer-executable instructions that, when executed on the one or more processors, performs acts comprising:
      receiving, from the payload image sensor and by the one or more processors, pattern data corresponding to at least a portion of a pattern located on or affixed to an object; and
      determining, based at least in part on the portion of the pattern sensed by the payload image sensor, a position and orientation of the object in the payload bay.

2. The UAV as recited in claim 1, wherein the pattern comprises at least one of a barcode or a two-dimensional (2D) barcode repeated at least once on the object, and wherein determining the position and orientation of the object comprises accessing information corresponding to a first instance of the at least one of the barcode or the 2D barcode.

3. The UAV as recited in claim 1, wherein the pattern comprises at least one of a barcode or a two-dimensional (2D) barcode repeated at least once on the object, and wherein the acts further comprise:
   counting instances of the at least one of the barcode or the 2D barcode,
   determining the position of the object based at least in part on the counting of the instances of the at least one of the barcode or the 2D barcode; and
   determining that the object is properly seated in the payload bay based at least in part on determining the position of the object.

4. The UAV as recited in claim 1, wherein the object is a first object, the pattern is a first pattern, the pattern data is first pattern data, and the acts further comprise:
   receiving, from the payload image sensor and by the one or more processors, second pattern data corresponding to a first portion of a second pattern located on or affixed to a second object; and
   determining, based at least in part on a second portion of the second pattern sensed by the payload image sensor, a position and orientation of the second object in the payload bay.

5. A method comprising:
   detecting, by a sensor, a pattern located on or affixed to an object that has been inserted into a storage location; and
   determining, based at least in part on at least one of a location of the pattern relative to the storage location or an amount of the pattern sensed by the sensor, at least one of a position or an orientation of the object in the storage location.

6. The method as recited in claim 5, wherein the pattern comprises at least one of a barcode or a two-dimensional (2D) barcode repeated one or more times, and wherein determining the position or the orientation of the object comprises accessing information corresponding to a first instance of the at least one of the barcode or the 2D barcode.

7. The method as recited in claim 5, wherein the pattern is positioned on the object so as to be detected by the sensor when the object is properly seated in the storage location.

8. The method as recited in claim 5, wherein the pattern is a first pattern, and wherein determining at least one of a position or the orientation of the object comprises:
   detecting a second pattern located on or affixed to the object;
   determining one or more relationships between the first pattern and the second pattern; and
   determining, based on the one or more relationships, a spatial relationship between the sensor and the object.

9. The method as recited in claim 5, wherein the sensor is a Hall effect sensor, and the pattern comprises at least one of magnetic ink printed on the object or magnetic materials coupled to the object.

10. The method as recited in claim 5, wherein the sensor comprises a micro-switch sensor, the pattern comprises an embossed pattern, and wherein the object being inserted into the storage location causes the micro-switch sensor to detect the embossed pattern.

11. The method as recited in claim 5, wherein the at least one of the position or the orientation of the object is at least one of a first position or a first orientation in the storage location, the object is a first object, the pattern is a first pattern, and further comprising:
   detecting, by the sensor, that a second object has been inserted into the storage location;
   detecting, by the sensor, a second pattern located on or affixed to a second object that has been inserted into the storage location; and
   determining, based at least in part on the second pattern, at least one of a second position and a second orientation of the second object in the storage location.

12. The method as recited in claim 11, further comprising:
   determining, based at least in part on the second pattern, at least one of a third position and a third orientation of the first object in the storage location.

13. The method as recited it claim 5, wherein detecting the pattern comprises detecting first characteristics of the pattern located on or affixed to the object, and wherein determining the at least one of the position or the orientation of the object comprises:
   accessing information associated with second characteristics of the pattern; and
   determining the at least one of the position or the orientation of the object based at least in part on the first characteristics and the second characteristics.

14. A vehicle comprising:

a payload bay;

a sensor located proximate to the payload bay;

one or more processors; and memory storing computer-executable instructions that, when executed on the one or more processors, performs acts comprising:

transmitting, by the sensor and to the one or more processors, pattern data corresponding to a pattern located on or affixed to an object inserted into the payload bay; and determining, based at least in part on the pattern data, at least one of a position or an orientation of the object in the payload bay.

15. The vehicle as recited in claim 14, wherein the pattern is a first pattern, and wherein determining the at least one of a position or an orientation of the object in the payload bay comprises:

comparing the pattern data to a second pattern located on or affixed to the object, generating a comparison based on comparing the pattern data to the second pattern, and determining the position or the orientation of the object based at least in part on the comparison.

16. The vehicle as recited in claim 14, wherein the sensor is a Hall effect sensor, and the pattern comprises at least one of magnetic ink printed on the object or magnetic materials coupled to the object.

17. The vehicle as recited in claim 14, wherein the object is a first object, the pattern is a first pattern, the pattern data is first pattern data, and the acts further comprise:

transmitting, by the sensor and to the one or more processors, second pattern data corresponding to a second pattern located on or affixed to a second object inserted into the payload bay; and determining, based at least in part on the second pattern data, at least one of a second position or a second orientation of the second object in the payload bay.

18. The vehicle as recited in claim 14, the acts further comprising:

causing the object to be removed from the payload bay;

detecting, by the sensor and while the object is being removed, a pattern located on or affixed to the object;

transmitting, by the sensor and to the one or more processors, pattern data corresponding to the pattern; and determining, based at least in part on the pattern, that the object is no longer within the payload bay.

19. The vehicle as recited in claim 14, wherein determining the at least one of the position or the orientation of the object in the payload bay comprises:

determining, based on the pattern data, a size of the pattern, and determining the position of the object based on the size of the pattern.

20. The vehicle as recited in claim 14, wherein the acts further comprise determining that the object is properly seated in the payload bay.

\* \* \* \* \*